No. 654,046.  
A. M. ARTHURS.  
STEAM COOKER.  
(Application filed Apr. 19, 1900.)  
Patented July 17, 1900.
(No Model.)  
2 Sheets—Sheet 1.
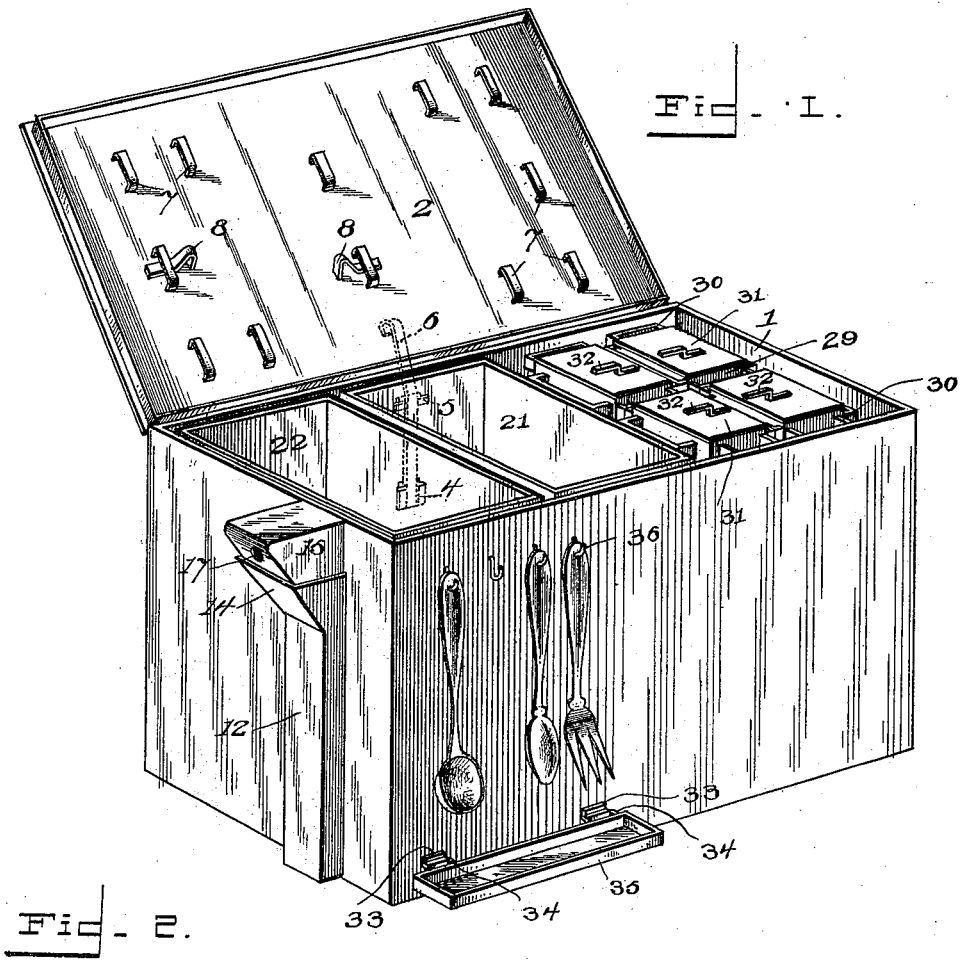
Fig. 1.
Fig. 2.
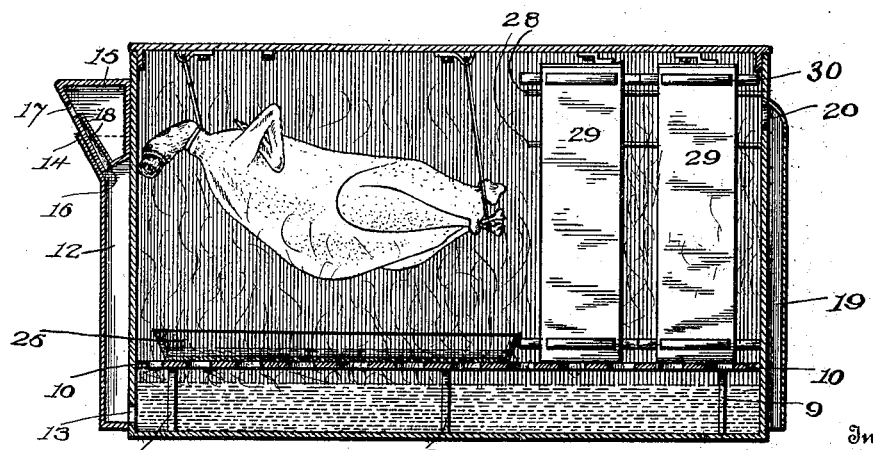
Witnesses:  
Inventor:  
Anna M. Arthurs,  
by H. B. Willson & Co.  
Attorneys.
THE NORRIS PETERS CO., PHOTO-LITHO., WASHINGTON, D. C.

No. 654,046. Patented July 17, 1900.
A. M. ARTHURS.
STEAM COOKER.
(Application filed Apr. 19, 1900.)
(No Model.) 2 Sheets—Sheet 2.
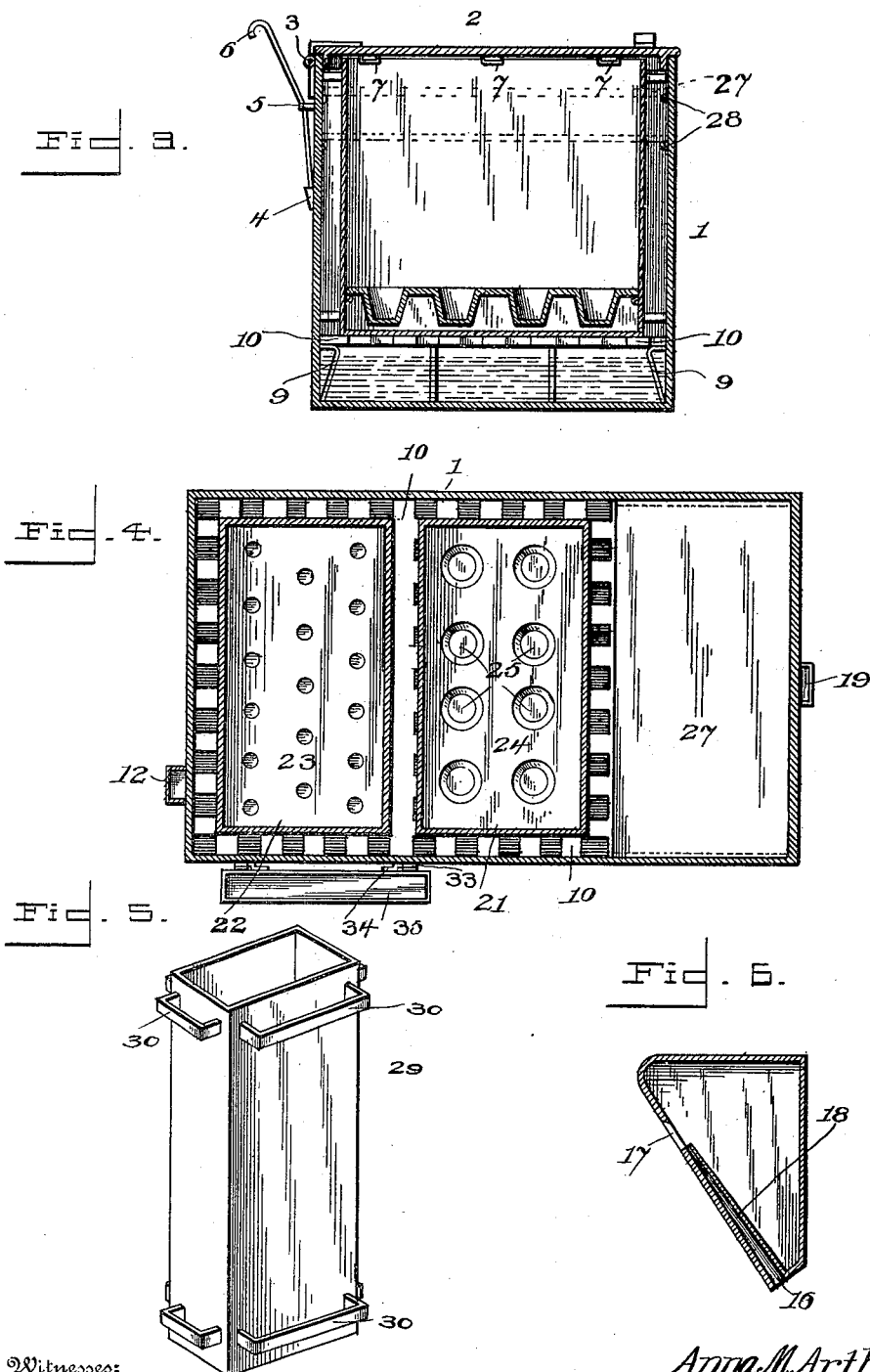

United States Patent Office.

ANNA M. ARTHURS, OF PITTSBURG, PENNSYLVANIA.

STEAM-COOKER.

SPECIFICATION forming part of Letters Patent No. 654,046, dated July 17, 1900.

Application filed April 19, 1900. Serial No. 13,486. (No model.)

*To all whom it may concern:*

Be it known that I, ANNA M. ARTHURS, a citizen of the United States, residing at Pittsburg, in the county of Allegheny and State of Pennsylvania, have invented certain new and useful Improvements in Steam-Cookers; and I do declare the following to be a full, clear, and exact description of the invention, such as will enable others skilled in the art to which it appertains to make and use the same.

My invention relates to certain novel improvements in steam food-cookers; and the object is to provide a simple, inexpensive, and compact utensil of this character by which several articles of food may be cooked at the same time.

To this end the invention consists in the construction, combination, and arrangement of the device, as will be hereinafter more fully described, and particularly pointed out in the claim.

The accompanying drawings show my invention in the best form now known to me; but many changes in the details might be made within the skill of a good mechanic without departing from the spirit of my invention as set forth in the claims at the end of this specification.

The same reference characters indicate the same parts of the invention.

Figure 1 is a perspective view of my improved steam-cooker with the lid thrown back and supported in that position by the detachable arm, which is shown in outline by the dotted lines. Fig. 2 is a longitudinal section. Fig. 3 is a transverse section. Fig. 4 is a horizontal section. Fig. 5 is a detail perspective view of one of the removable food-receptacles. Fig. 6 is a sectional view of the whistle.

1 denotes the outer shell or casing, and it is preferably rectangular in form and of a size to correspond to the amount of cooking to be done at one operation. It is provided with a hinged lid 2, removably secured to the shell by a rod 3, which may be withdrawn when necessary to permit the lid to be detached in order to properly wash the device.

4 denotes a socket, and 5 a strap, both of which are fixed to the outside of the rear wall of the shell to receive the angular detachable arm 6, which supports the lid or cover when raised, as shown in Fig. 1.

7 7 denote a series of cleats or straps fixed at suitable intervals to the inside face of the hinged lid 2, and 8 8 denote supporting-hooks which are detachably secured in said cleats and from which a fowl, joint of meat, a ham, or the like may be suspended when cooking.

9 9 represent a series of brackets fixed in the same horizontal plane on the inner faces of the four walls of the shell 1, near the bottom, to support the removable foraminous shelf 10.

12 denotes a vertical tube fixed to the outside of one of the end walls of the shell, its lower end communicating with the interior of the shell through the passage-way 13, and the upper end of said tube terminates in a rectangular funnel-shaped mouth 14, by means of which water may be supplied to the cooker as desired to replace that consumed in the steaming process.

15 represents a hollow cap or hood of a shape to conform to the mouth 14 of the tube, which it snugly fills when in place, and it is provided with an inlet-orifice 16, communicating with the tube, and an outlet-orifice 17, communicating with the atmosphere, and 18 denotes a steam-whistle extending between the orifices 16 17 in said cap, which will automatically sound an alarm when the water-level in the shell falls sufficiently to allow the steam to escape into the tube through the passage 13. The opposite parallel end wall of the shell is provided with a vent-tube 19, open at its lower end and closed at its upper end, except the orifice 20, which communicates with the interior of said shell for the purpose of permitting the escape of the gases generated within the shell or expelled from the contents thereof.

21 represents a removable chamber, and 22 a counterpart chamber, except that it is provided with a perforated diaphragm 23 for supporting such articles of food as it is desirable to have the steam come in contact with at all parts.

24 denotes a diaphragm removably supported in the chamber 21, and it is provided with a series of cup-shaped recesses or pockets 25, in which eggs may be poached.

26 represents the dripping-pan, and 27 27 denote removable shelves resting on the horizontal cleats 28 28 for steaming dumplings and the like.

29 29 denote a series of rectangular boxes or chambers set upon end and provided on two sides with spacing-guards 30 30 to maintain them at suitable distances apart to permit the free circulation of the steam on their four sides. The open mouths of these boxes are closed by the separate covers 31 31, the outside or upper face of each of which is provided with a clip-finger 32, which engages one of the cleats 7 in the lid 2, so that when the lid is raised the covers 31 are all simultaneously raised, and, vice versa, when the lid is closed the said covers are lowered over their respective boxes.

33 33 denote vertical parallel strap-cleats fixed to the outside of the front wall of the shell to receive the clip-fingers 34 34 on the drip-pan 35, removably secured thereto to receive the drippings from the basting forks and spoons suspended from the hooks 36 36, as shown in Fig. 1, and when the cooker is not in use these detachable parts—such as the arm 6, drip-pan 35, forks, spoons, and the like—may be conveniently secured in the cleats 7 7 in the lid 2.

Various other uses—such as steaming grits, oatmeal, and the like, as well as numerous other foods—will readily suggest themselves to the modern housekeeper.

Having thus fully described my invention, what I claim as new and useful, and desire to secure by Letters Patent of the United States, is—

1. The combination with the shell 1, of the hinged lid 2 provided with a series of fixed cleats 7 7 and a series of independent hooks 8 8 removably secured in said cleats, substantially as shown and described.

2. The combination with the shell 1 and the hinged lid 2 provided with a series of cleats 7 7, of the independent food-boxes 29 29 and their removable covers 31 31 provided with the clip-fingers 32 adapted to engage said cleats 7 7, substantially as shown and described.

In testimony whereof I have hereunto set my hand in presence of two subscribing witnesses.

ANNA M. ARTHURS.

Witnesses:
ALEXANDER WOOD,
G. J. ANDERSON.